(12) United States Patent
Rozman et al.

(10) Patent No.: US 8,305,781 B2
(45) Date of Patent: Nov. 6, 2012

(54) INVERTER WITH HIGH FREQUENCY ISOLATION TRANSFORMER

(75) Inventors: Gregory I. Rozman, Rockford, IL (US); Graham T. Fordyce, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 694 days.

(21) Appl. No.: 12/112,075

(22) Filed: Apr. 30, 2008

(65) Prior Publication Data

US 2009/0273952 A1 Nov. 5, 2009

(51) Int. Cl.
*H02M 7/42* (2006.01)
(52) U.S. Cl. ......................................................... 363/41
(58) Field of Classification Search .................. 363/17, 363/39, 40, 41, 71
See application file for complete search history.

(56) References Cited

U.S. PATENT DOCUMENTS

| | | | | |
|---|---|---|---|---|
| 3,919,620 | A * | 11/1975 | McMurray et al. | 363/135 |
| 4,060,757 | A * | 11/1977 | McMurray | 363/57 |
| 5,444,608 | A * | 8/1995 | Jain et al. | 363/17 |
| 5,576,943 | A * | 11/1996 | Keir | 363/56.05 |
| 5,654,880 | A * | 8/1997 | Brkovic et al. | 363/17 |
| 5,737,197 | A * | 4/1998 | Krichtafovitch et al. | 363/17 |
| 5,757,633 | A * | 5/1998 | Bowles | 363/71 |
| 6,166,933 | A * | 12/2000 | Bowers | 363/56.05 |
| 6,654,261 | B2 * | 11/2003 | Welches et al. | 363/41 |
| 7,193,864 | B2 * | 3/2007 | Hansson et al. | 363/16 |
| 7,193,872 | B2 * | 3/2007 | Siri | 363/95 |
| 7,289,338 | B2 * | 10/2007 | Kawasaki et al. | 363/16 |
| 7,561,449 | B2 * | 7/2009 | Suzuki et al. | 363/55 |
| 7,800,922 | B2 * | 9/2010 | Takayanagi et al. | 363/17 |
| 2008/0054841 | A1 * | 3/2008 | Kerkman et al. | 318/807 |
| 2009/0273952 | A1 * | 11/2009 | Rozman et al. | 363/41 |

* cited by examiner

*Primary Examiner* — Adolf Berhane
*Assistant Examiner* — Yemane Mehari
(74) *Attorney, Agent, or Firm* — Carlson, Gaskey & Olds, PC

(57) ABSTRACT

An inverter receives a DC power supply and converts it into AC power to a primary coil of a high frequency transformer. The output of the high frequency transformer passes through two secondary coils, and each secondary coil is associated with a bus. The busses supply positive and negative AC power to a downstream output. The flow of the power from the two busses is alternatively controlled to provide a desired frequency on the output.

20 Claims, 9 Drawing Sheets

US 8,305,781 B2

INVERTER WITH HIGH FREQUENCY ISOLATION TRANSFORMER

BACKGROUND OF THE INVENTION

This application relates to an inverter to supply sinusoidal output voltage to the loads, including non-linear loads.

Inverters are used in power supplies, such as for electric motors. A DC source supplies DC power through a gate drive to control the voltage supplied downstream towards the motor. In one application typically used on aircraft, 400 hertz is required. To achieve this with a voltage supplied from the common 270 volt DC power supply, a 400 hertz transformer has been used. This has required a relatively large size and weight for the overall inverter.

SUMMARY OF THE INVENTION

In the disclosed embodiment of this invention, an inverter includes a DC-DC converter that operates at a high switching frequency via a high frequency transformer. The output of the transformer switches to enable two high frequency AC buses with positive and negative DC content.

These and other features of the present invention can be best understood from the following specification and drawings, the following of which is a brief description.

DETAILED DESCRIPTION OF THE PREFERRED EMBODIMENT

Figure 1A:
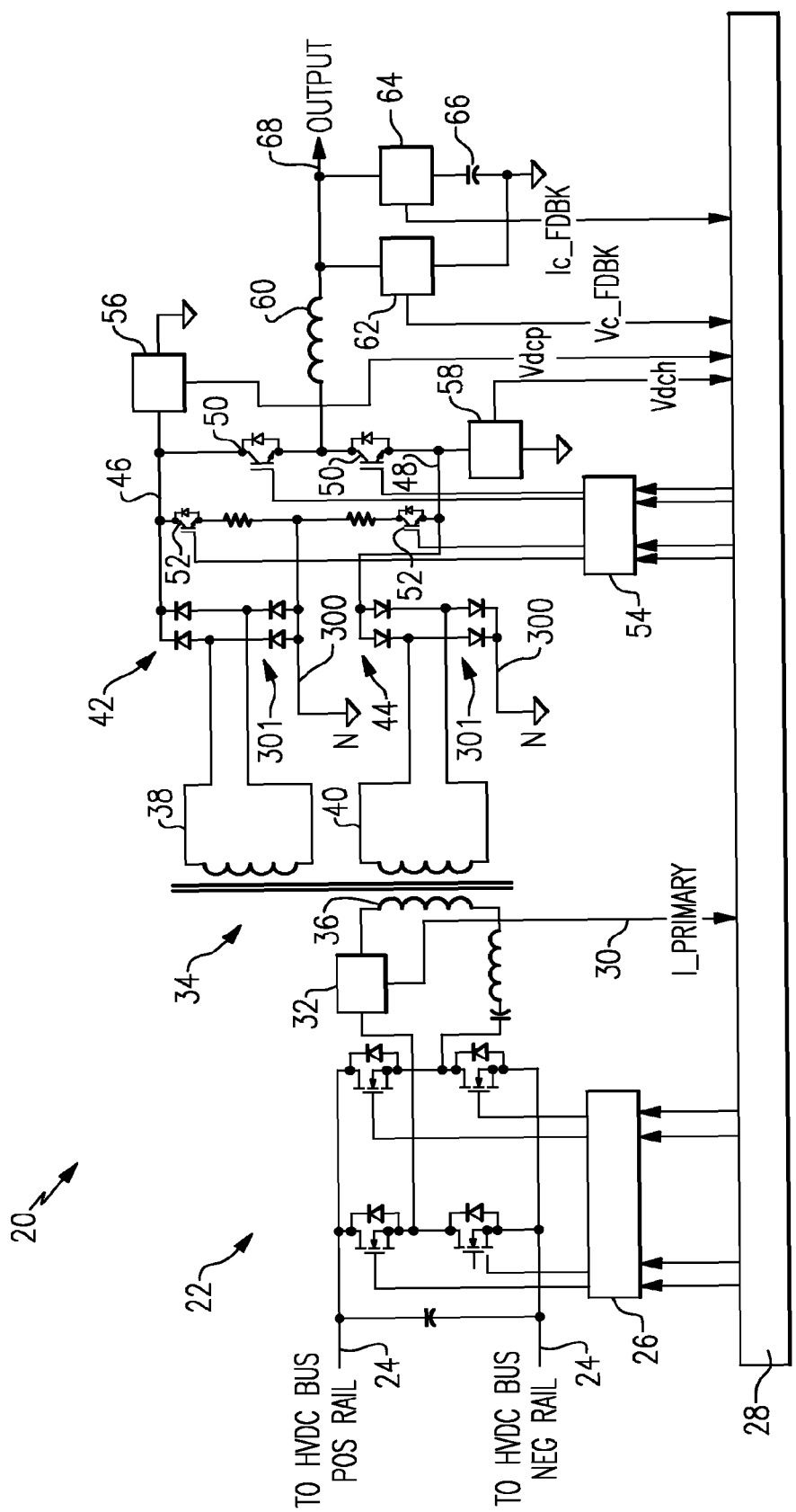
FIG. 1A shows one embodiment.

An inverter 20 is illustrated in FIG. 1A. As known, a phase shift zero voltage transition converter or full bridge 22 converts power from a DC source 24 downstream towards an output 68. A gate drive 26 controls the flow of the voltage through the gate drive.

Controller 28 controls each of the components. A current sensor 32 sends the current through a line 30 to the controller for feedback purposes, to be explained below. A high frequency transformer 34 takes voltage in at a primary coil 36, and transforms that primary coil into secondary coils 38 and 40. Rectifiers 42 and 44 convert the high frequency AC power from the transformer into the two AC high frequency busses 46 and 48 with positive 46 and negative 48 DC components. Output switches 50 are controlled, such as by a half sine wave control, to alternatively supply power downstream to the output 68 via filter that includes inductor 60 and capacitor 66. The buses 46 and 48 thus alternate power supply to the common output 68 to achieve a desired frequency. The filter rejects high frequency components. Snubbers 52 control the overvoltage spikes during switching events of switches 50. An output stage gate drive 54 controls the switches 50 and 52, as will be explained below. A voltage sensor 56 sends a voltage reading on line 46 back to the controller 28. Similarly, a voltage sensor 58 supplies the voltage on the line 48 back to the controller. Sensors 62 and 64 send voltage and current readings, respectively, to the controller 28. Neutral lines 300 are attached to the diodes. The above topology blocks the reversed power flow and is applicable to resistive and non-linear loads.

Figure 1B:
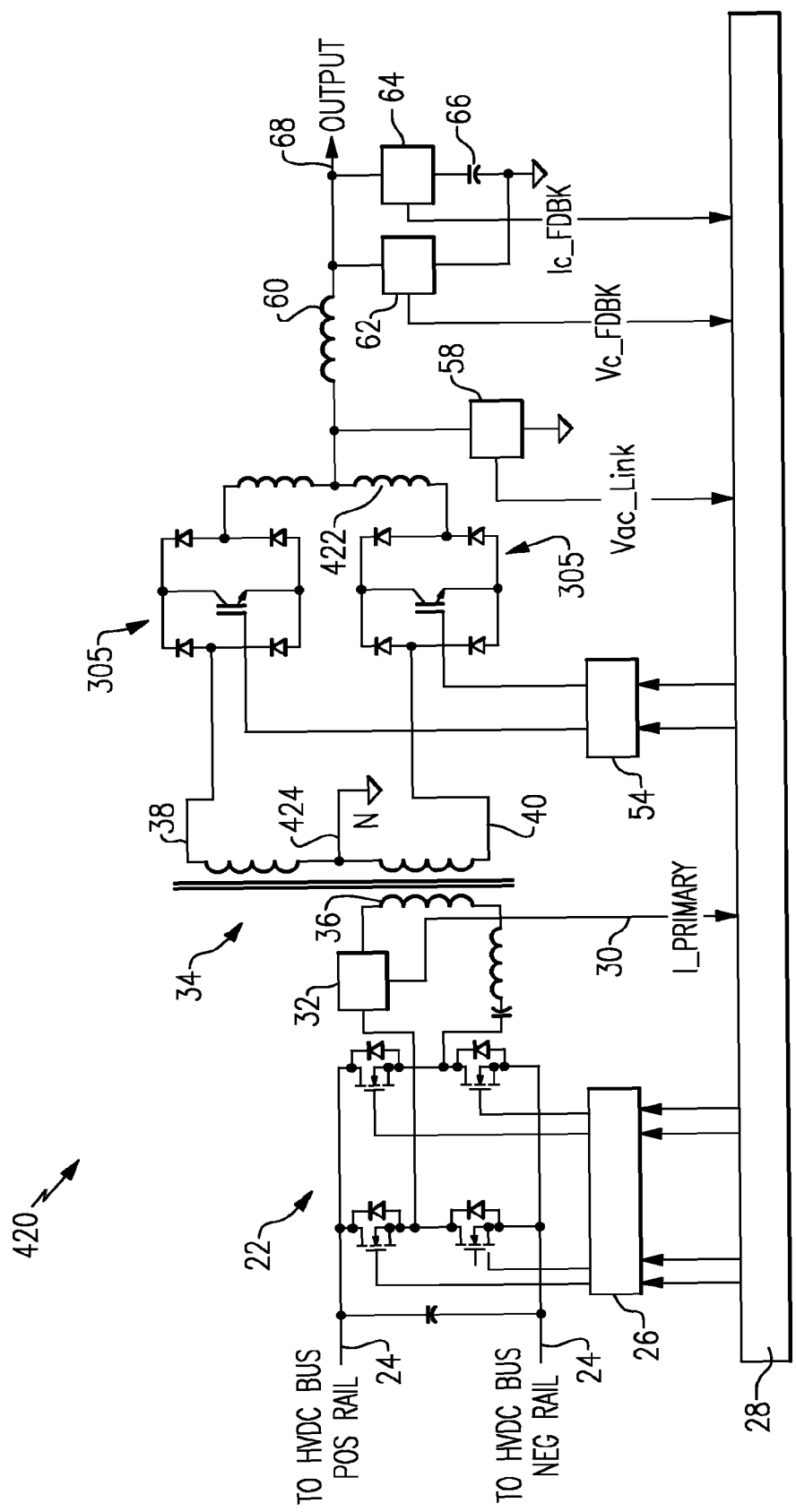
FIG. 1B shows an inverter topology according to an alternate embodiment.

FIG. 1B shows an alternative embodiment inverter 420. This topology enables bi-directional power flow and can support not only the non-linear loads, but also linear loads with leading or lagging power factor. In the alternative embodiment 420, the neutral line 424 is attached between secondary coils 38 and 40, and rectification is accomplished by a bi-directional switch, which comprises the diode bridge and transistor. In addition, the switches 50 of the FIG. 1A embodiment are replaced by commutating inductors 422. Otherwise, the FIG. 1A and FIG. 1B circuits are similar. While the more inclusive circuits of FIGS. 2 and 3 are not shown with the FIG. 1B embodiment, they certainly can be provided with the FIG. 1A circuitry rather than the FIG. 1B embodiment.

Figure 2:
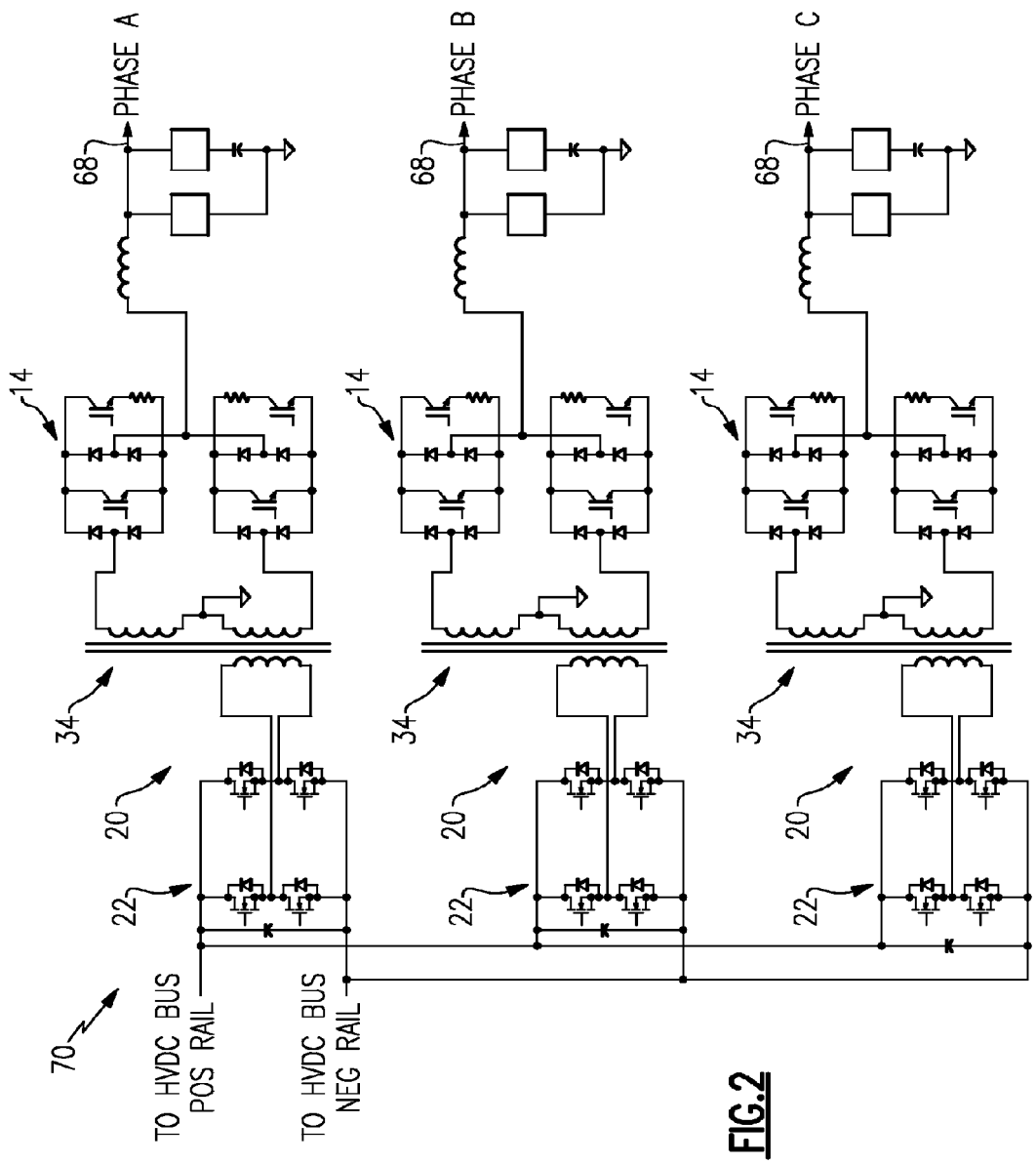
FIG. 2 shows the inverter topology of FIG. 1A as incorporated into a three-phase power supply.

FIG. 2 shows a topology 70 wherein there are essentially three of the inverters 20 incorporated to supply three phases of power to the output. As shown in FIG. 2, the circuit portions 14 operate generally the same as the corresponding circuit portions in Figure 1A or 1B.

Figure 3:
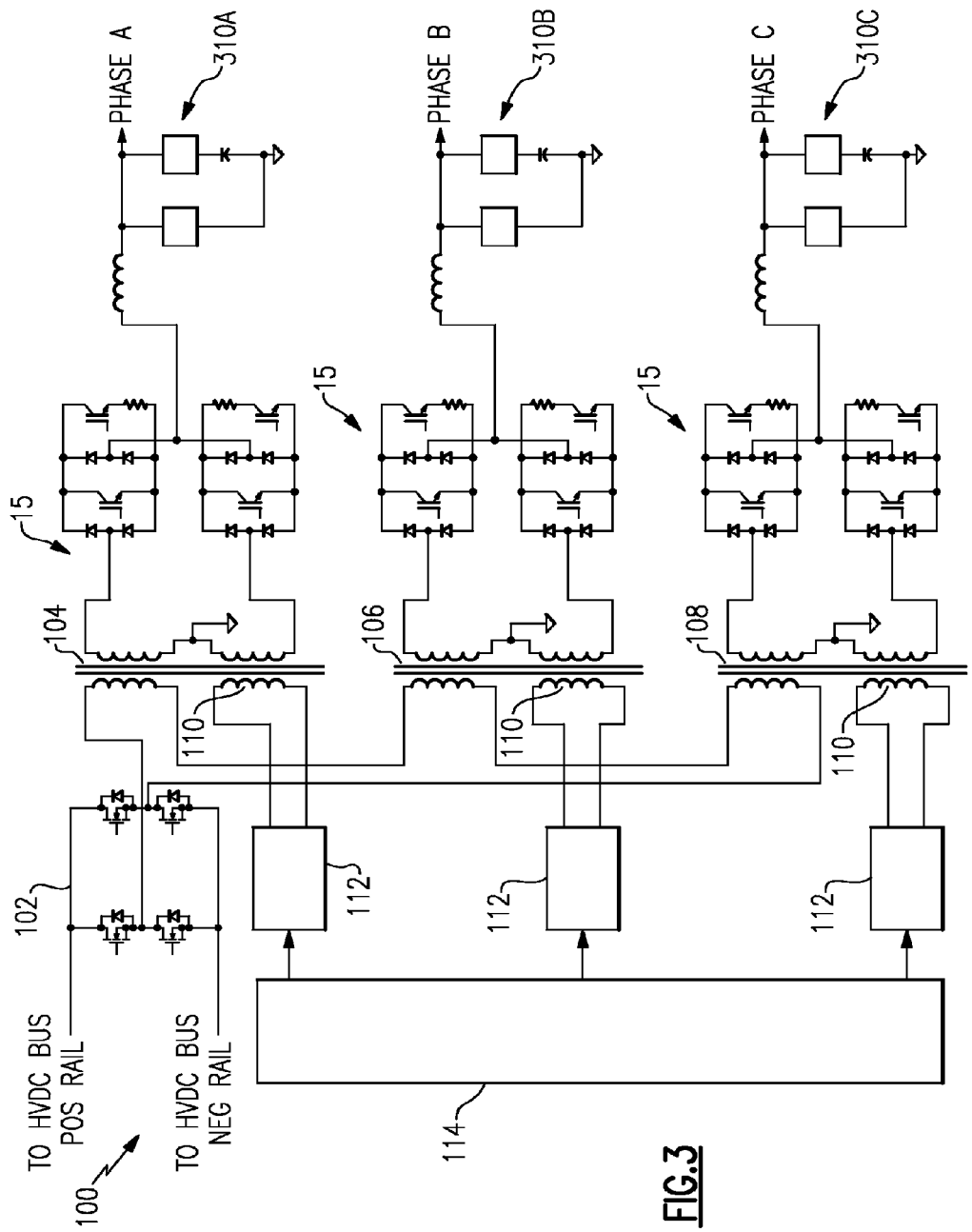
FIG. 3 shows an alternative embodiment of an inverter.

FIG. 3 shows an inverter 100 according to an alternate embodiment wherein one H-bridge 102 provides AC power to transformers 104, 106 and 108. The voltage modulation on transformers secondary windings is accomplished by controlling DC current in the control windings 110 of the transformers 104, 106, and 108 to achieve sinusoidal output on the inverter outputs. The circuit portions 15 operate in a manner similar to the corresponding circuit portions of Figures 1A and 1B.

Figure 4:
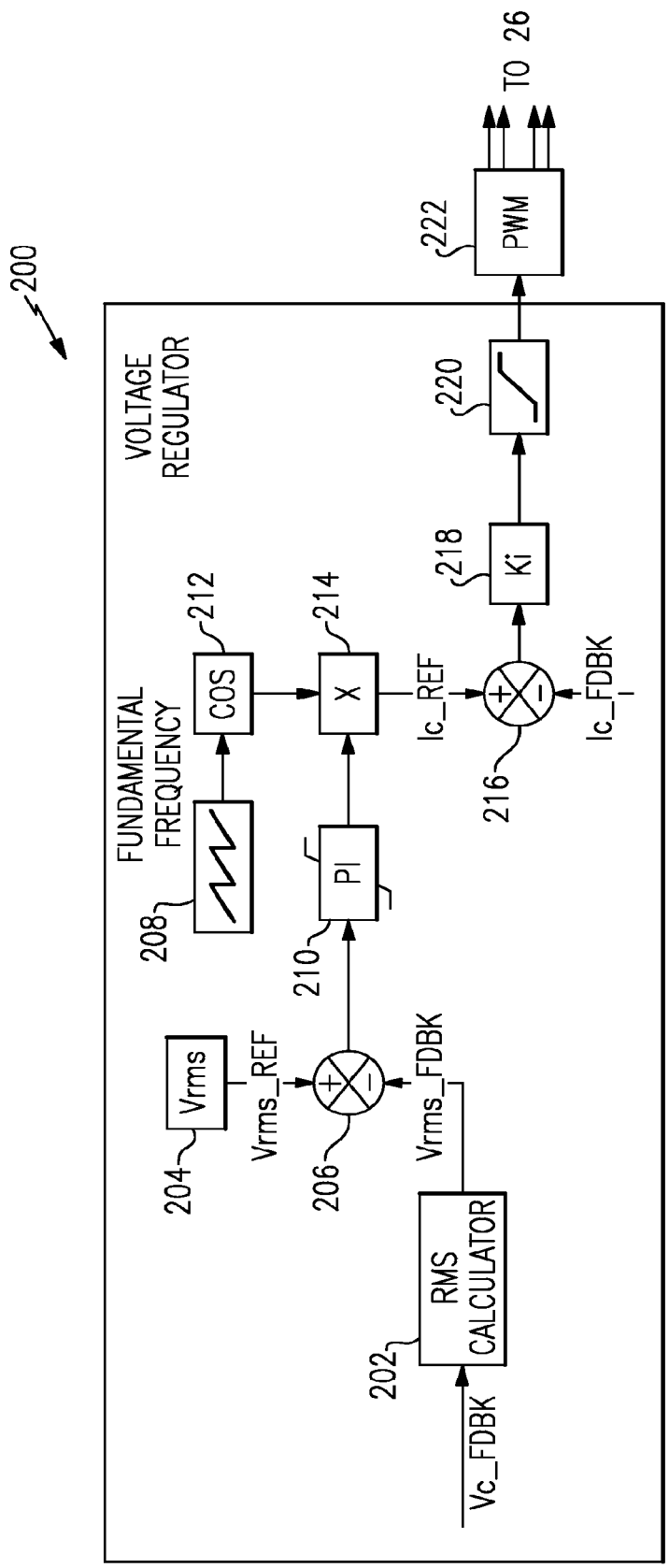
FIG. 4 shows a functional block diagram of a first example controller.

FIG. 4 shows a control feature 200. An RMS calculator 202 receives the voltage from a voltage sensor 62 (FIGS. 1A, 1B). That sensed voltage is sent to a summer 206 where it is compared to a desired RMS voltage supplied by box 204. The box 204 is part of controller 28. A sawtooth wave generator 208 communicates through a cosine function 212 to a multiplier 214 along with an output of PI block 210. The output of multiplier 214 is output capacitor current reference. The error between the current reference Ic_REF and the capacitor current Ic_FDBK is processed by a gain block 218 and a limiter 220. The limiter output is sent to PWM modulator 222, which controls the gate drive 26. Maintaining sinusoidal current through the output capacitor 66 insures sinusoidal voltage across the capacitor and subsequently across the output load.

Figure 5:
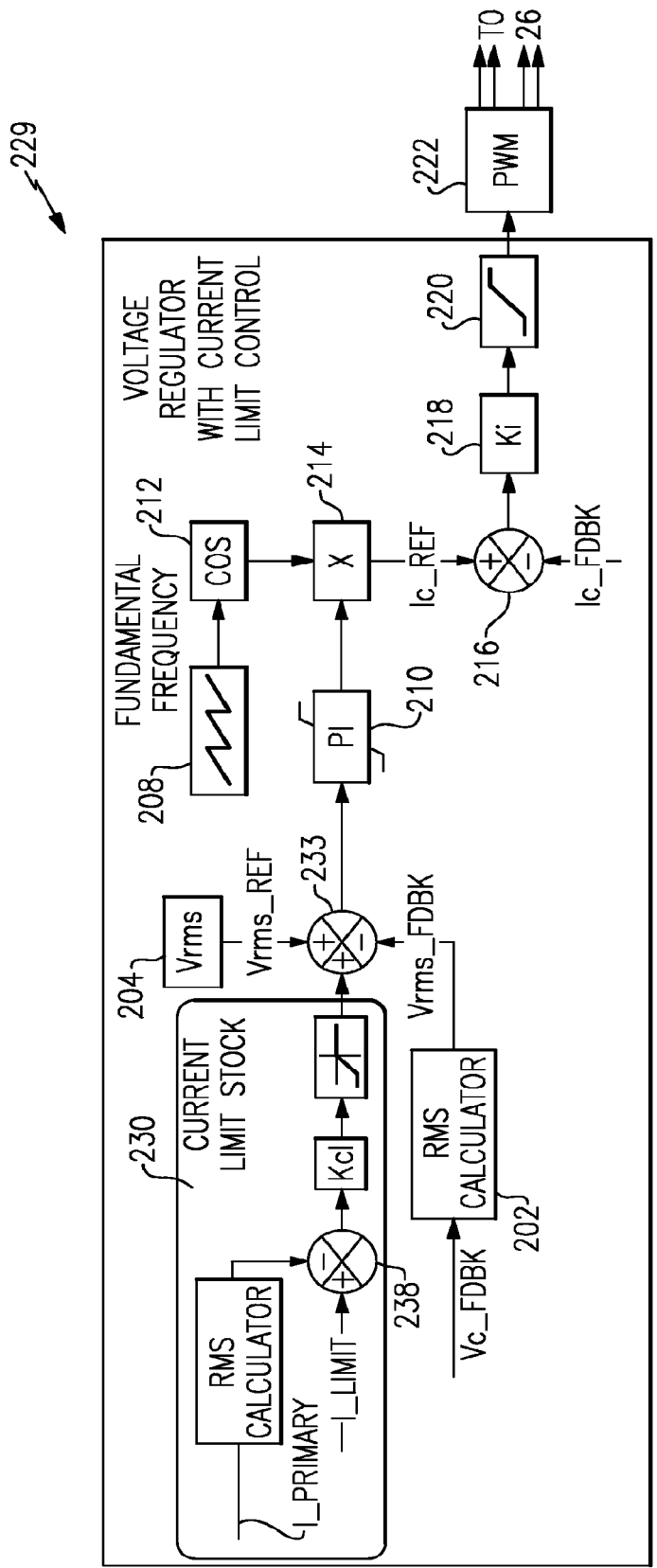
FIG. 5 shows a functional block diagram of a second example controller.

FIG. 5 shows an alternative control feature 229, which operates similarly to the control feature 200, with the addition of a current limit block 230. Control feature 229 is provided with feedback from the current sensor 32 (FIGS. 1A, 1B), which is sent to a summer 232 with a limit. The output of summer 232 goes to a summer 233. If the sensed current is below the limit, then control proceeds as with the FIG. 4 embodiment. On the other hand, if the sensed current is above the limit, then the control operates to maintain the current at the limit.

Figure 6A:
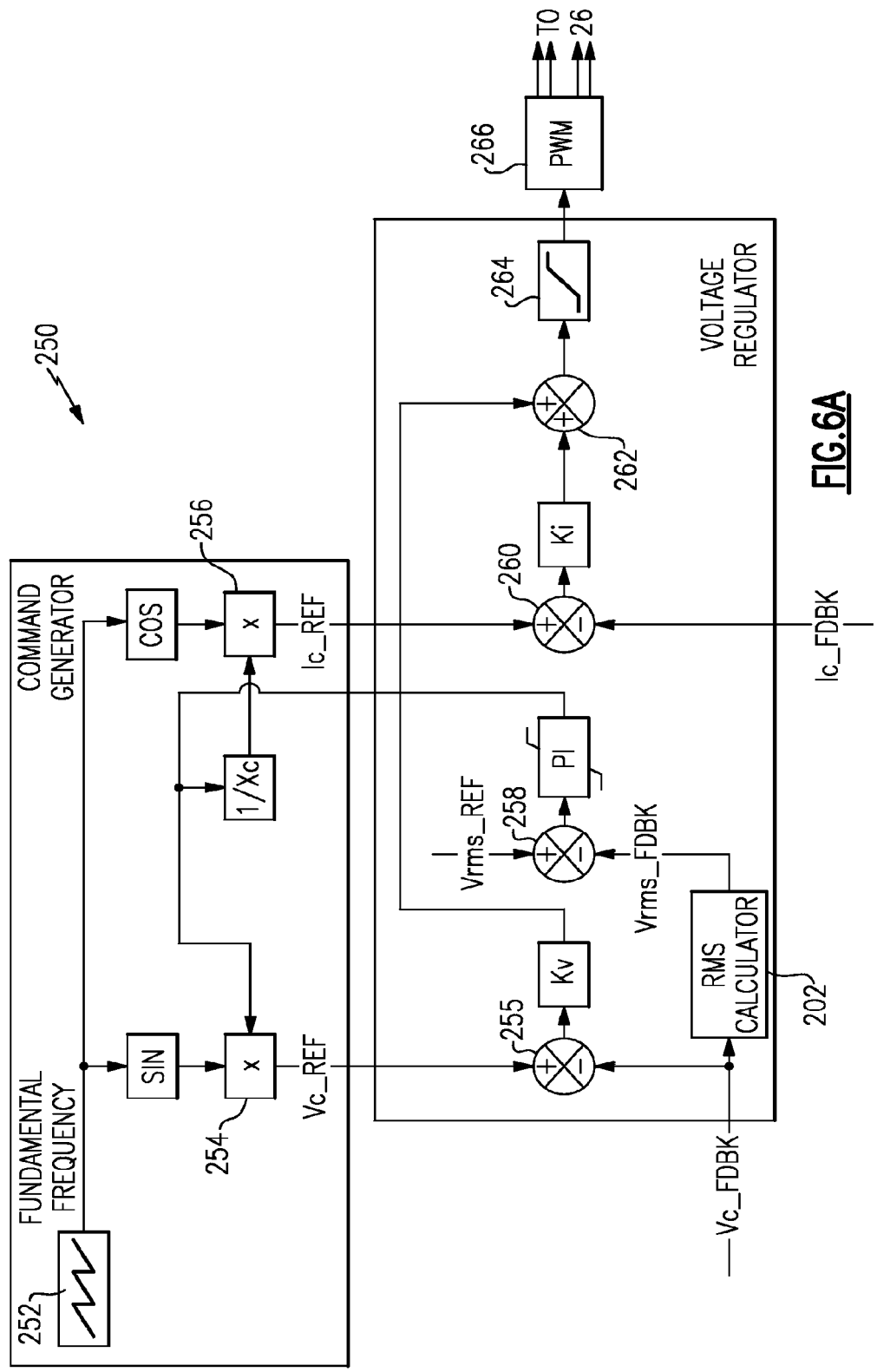
FIG. 6A shows a functional block diagram of a third example controller.

FIG. 6A shows another control feature 250 according to an embodiment wherein a sawtooth waveform at fundamental frequency 252 passes through a sine function to a multiplier 254 to supply a voltage reference. The multiplier 254 receives signal from the "slow" voltage loop that comprises RMS calculator 202, an RMS voltage reference Vrms_REF, error summer 258, and a PI block. The Vc_REF signal at the multiplier 254 output is therefore adjusted in response to the "slow" voltage loop. Similarly, the multiplier 256 receives signal from the PI block via gain 1/Xc, where Xc the represents the impedance of the output capacitor 66 at the fundamental frequency. The "fast" voltage loop is comprised of capacitor voltage and capacitor current sections. The capacitor voltage section includes a summer 255, voltage reference Vc_REF, voltage feedback Vc-FDBK, and a gain Kv. The capacitor current section includes a summer 260, a capacitor current reference Ic_REF, capacitor current feedback Ic-FDBK, and a gain Ki. The outputs of capacitor voltage and current sections are connected to a summer 262 and sent via limiter 26 to the PWM modulator 266 which goes to control the gate drive 26.

Figure 6B:
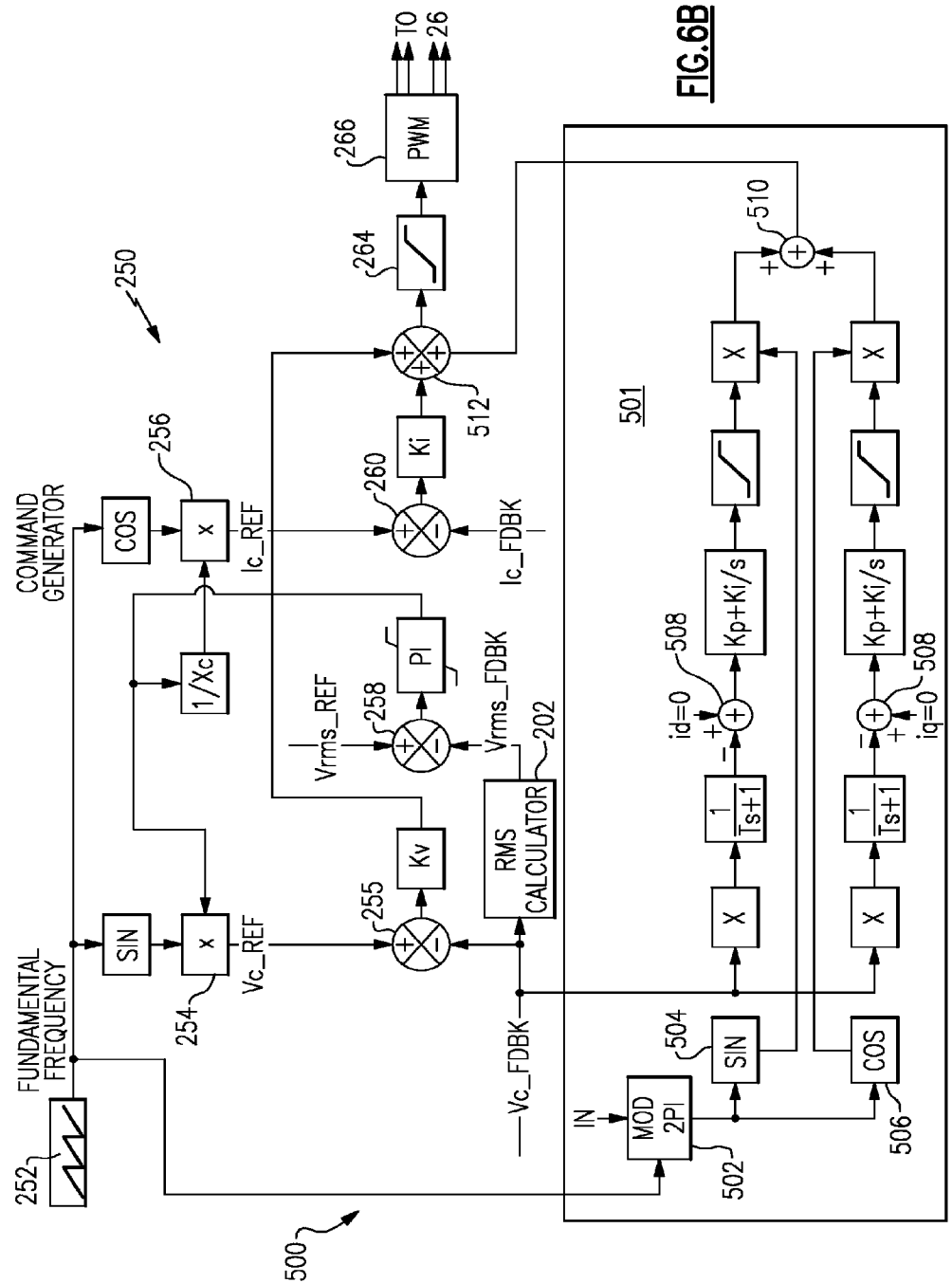
FIG. 6B shows an alternative embodiment of the third example controller.

FIG. 6B shows an alternate control feature 500 to the FIG. 6A embodiment. In this embodiment, a synchronizing compensator circuit 501 is included. A mod 2 pi multiplier box 502 is programmed to include frequency that would desirably be dropped out of the output of the overall circuit and sent to the pulse width modulated control. Box 502 sends its signals to a sine 504 box and cosine box 506. The outputs of these boxes flow through summers 508 and eventually to the summer 510. Summers 508 calculate the difference from zero in the signals. Thus, the output of summer 510, which reaches summer 512, is intended to delete certain frequency from the output of the overall circuit. The synchronous compensator is tuned to eliminate a single harmonic, for example $5^{th}$, $7^{th}$, etc. Several synchronous compensators can be connected in parallel to eliminate the undesirable harmonics in the output voltage due to non-linear loads.

Figure 7:
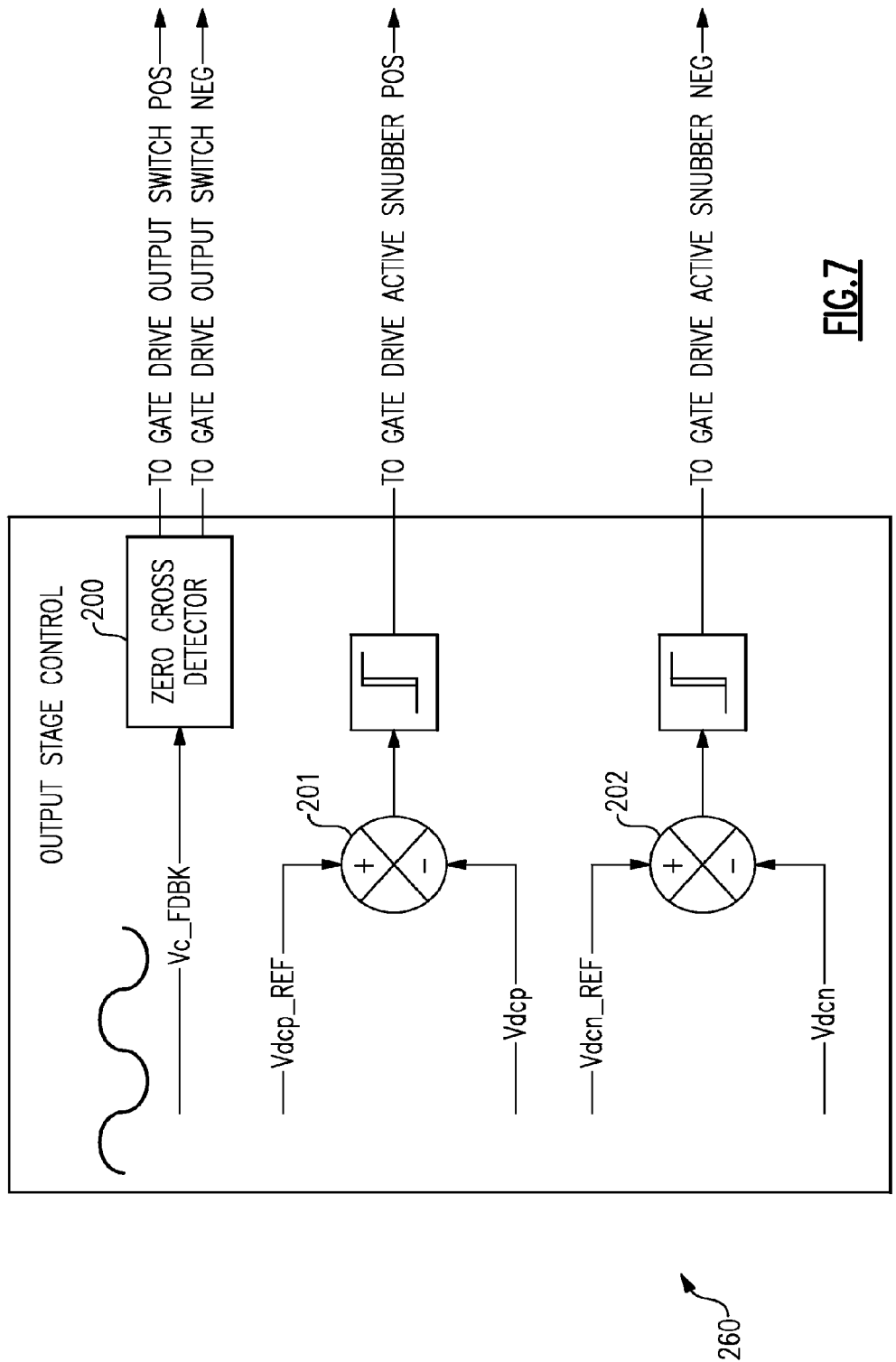
FIG. 7 shows a functional block diagram of the control of an output switches for this application.

FIG. 7 schematically shows the control 260 of the switches 50 and 52 (FIGS. 1A, 1B). As shown, a zero cross detector 200 monitors the sine wave function, and selectively switches the positive and negative switches 50 on and off to allow the flow of voltage to the output 66. At the same time, the switches for snubbers 52 are controlled in an opposite manner such that when a switch 50 is closed, its snubber switch 52 is open. Summers 201 and 202 assist in the control. Elements 200, 201 and 202 are all part of controller 28.

The disclosed invention provides an inverter that is able to use a relatively smaller and lighter weight transformer to supply 400 hertz output.

While the inverter has application in many different uses, in particular it has application for controlling accessories on an aircraft, such as aircraft motors, which must be supplied with 400 hertz power.

Some of the disclosed circuitry is shown schematically. However, a worker of ordinary skill in this art would recognize what is conveyed by the components, and how they would operate to provide the functions as set forth above.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A power supply and inverter combination comprising:
    a DC power supply for supplying current to a high frequency transformer;
    said high frequency transformer having at least two secondary coils, a rectifier associated with a first of said secondary coils generating positive DC power and supplying said positive DC power to a positive bus, a rectifier associated with a second of said secondary coils generating negative DC power and supplying said negative DC to a negative bus; and
    a control for controlling the supply of power downstream from the positive and negative busses to alternate the power to be supplied to a common downstream output to achieve a desired frequency; and
    a synchronizing compensator circuit is included into the control for the inverter, with said synchronizing compensator circuit operating to remove selected frequencies from the power supply to the output.

2. The combination as set forth in claim 1, wherein the control includes a power switch associated with each of said positive and negative busses, said switch being controlled to alternate the supply of power to the downstream output, and at the desired frequency.

3. The combination as set forth in claim 2, wherein said power switches on said busses are also provided with a parallel path through snubbers.

4. The combination as set forth in claim 1, wherein a power converter is provided between said DC power supply and a primary coil of said transformer.

5. The combination as set forth in claim 4, wherein a gate drive control controls the flow of voltage through said power converter.

6. The combination as set forth in claim 4, wherein a voltage to be supplied to the output is sensed, and provided as feedback to control the voltage supplied to said primary coil.

7. The combination as set forth in claim 6, wherein a current limit is also incorporated into a control of said DC power supply.

8. The combination as set forth in claim 6, wherein a current sensed at the output is also used to control the flow of voltage to the primary coil.

9. The combination as set forth in claim 1, wherein each of a plurality of said inverters supplies a phase of output power.

10. The combination as set forth in claim 9, wherein a DC control controls the amount of voltage supplied through the transformer to the secondary coils.

11. The combination as set forth in claim 1, wherein said desired frequency is 400 hertz.

12. The combination as set forth in claim 1, wherein the control includes commutating inductors used to control the supply of power from the secondary coils to the output.

13. A power supply and inverter combination comprising:
    a DC power supply for supplying current to a high frequency transformer;
    said high frequency transformer having at least two secondary coils, a rectifier associated with a first of said secondary coils generating positive DC power and supplying said positive DC power to a positive bus, a rectifier associated with a second of said secondary coils generating negative DC power and supplying said negative DC to a negative bus;
    a control for controlling the supply of power downstream from the positive and negative busses to alternate the power to be supplied to a common downstream output to achieve a desired frequency;
    said control includes a power switch associated with each of said positive and negative busses, said switch being controlled to alternate the supply of power to the downstream output, and at the desired frequency;
    said power switches on said busses are also provided with a parallel path through snubbers; and
    said snubbers are each supplied with a snubber switch, and said snubber switch is opened when said power switch is closed.

14. The combination as set forth in claim 13, wherein a synchronizing compensator circuit is included into the control for the inverter, with said synchronizing compensator circuit operating to remove selected frequencies from the power supply to the output.

15. The combination as set forth in claim 13, wherein a power converter is provided between said DC power supply and a primary coil of said transformer.

16. The combination as set forth in claim 13, wherein a DC control controls the amount of voltage supplied through the transformer to the secondary coils.

17. The combination as set forth in claim 15, wherein a gate drive control controls the flow of voltage through said power converter.

18. The combination as set forth in claim 15, wherein a voltage to be supplied to the output is sensed, and provided as feedback to control the voltage supplied to said primary coil.

19. The combination as set forth in claim 18, wherein a current limit is also incorporated into a control of said DC power supply.

20. The combination as set forth in claim 18, wherein a current sensed at the output is also used to control the flow of voltage to the primary coil.

* * * * *